US 7,478,202 B1

(12) United States Patent
Niver et al.

(10) Patent No.: US 7,478,202 B1
(45) Date of Patent: Jan. 13, 2009

(54) USING THE MESSAGE FABRIC TO MAINTAIN CACHE COHERENCY OF LOCAL CACHES OF GLOBAL MEMORY

(75) Inventors: Brett D. Niver, Grafton, MA (US); Steven R. Chalmer, Auburndale, MA (US); Steven T. McClure, Northboro, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/543,719

(22) Filed: Oct. 4, 2006

Related U.S. Application Data

(63) Continuation of application No. 10/462,949, filed on Jun. 17, 2003, now Pat. No. 7,136,969.

(51) Int. Cl.
*G06F 12/00* (2006.01)
*G06F 12/08* (2006.01)
*H04J 3/26* (2006.01)

(52) U.S. Cl. ............... 711/141; 711/144; 711/3; 711/113; 711/118; 711/119; 711/142; 711/146; 370/432; 370/394

(58) Field of Classification Search .......... 711/144, 711/3, 113, 118, 119, 142, 146; 370/432, 370/394
See application file for complete search history.

(56) References Cited

U.S. PATENT DOCUMENTS

| 6,088,769 A | * | 7/2000 | Luick et al. ............ 711/141 |
| 6,920,532 B2 | * | 7/2005 | Glasco et al. ........... 711/141 |
| 2002/0009095 A1 | * | 1/2002 | Van Doren et al. ....... 370/432 |

* cited by examiner

*Primary Examiner*—Hyung S Sough
*Assistant Examiner*—Mardochee Chery
(74) *Attorney, Agent, or Firm*—Muirhead and Saturnelli, LLC

(57) ABSTRACT

Described is a technique for maintaining local cache coherency between endpoints using the connecting message fabric. Processors in a data storage system communicate using the message fabric. Each processor is an endpoint having its own local cache storage in which portions of global memory may be locally cached. A write through caching technique is described. Each local cache line of data of each processor is either in an invalid or a shared state. When a write to global memory is performed by a processor (write miss or a write hit), the following are performed atomically: the global memory is updated, other processor's local cache lines of the data are invalidated, verification of invalidation is received by the processor, and the processor's local copy is updated. Other processors' cache lines are invalidated by transmission of an invalidate command by the processor. A processor updates its local cache lines upon the next read miss or write miss of the updated cacheable global memory.

20 Claims, 8 Drawing Sheets ance with one aspect of the invention is a method
USING THE MESSAGE FABRIC TO MAINTAIN CACHE COHERENCY OF LOCAL CACHES OF GLOBAL MEMORY

CROSS-REFERENCE TO RELATED APPLICATIONS

This application is a continuation of U.S. patent application Ser. No. 10/462,949, filed Jun. 17, 2003 now U.S. Pat. No. 7,136,969, USING THE MESSAGE FABRIC TO MAINTAIN CACHE COHERENCY OF LOCAL CACHES OF GLOBAL MEMORY, which is incorporated herein by reference.

BACKGROUND

1. Technical Field

This application generally relates to a computer system, and more particularly to maintaining cache coherency of data.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Within a system, such as the Symmetrix™ data storage system, messages may be communicated between different components using a switch fabric. The switch fabric may include one or more switches arranged to permit transmissions of messages between different components or endpoints, such as processors or directors, included in a single Symmetrix system. Messages may also be referred to as frames and may include a header portion and a payload, such as data. The data storage system may include data stored in a global memory accessible and used by the different endpoints. Each of the different endpoints may also have a local cache of portions of data from global memory. Various techniques may be used in connection with maintaining cache coherency between the data in global memory and in each of the local caches.

One existing technique has each of the endpoints polling global memory to determine when a portion of data in global memory has been modified, such as when a portion of the global memory is updated as a result of a write to global memory. This has a drawback in that each endpoint polls global memory using system resources resulting, for example, in increased traffic for each endpoint to continuously communicate with global memory. It may be desirable to have a technique in maintaining local cache coherency which decreases the amount of traffic.

SUMMARY OF THE INVENTION

In accordance with one aspect of the invention is a method for maintaining cache coherency in a data storage system between endpoints including: determining, by a first endpoint, whether a portion of cacheable global memory is to be written by said first endpoint, each of said endpoints having a local cache; if said portion is to be written by said first endpoint, performing atomically: writing, by said first endpoint, said portion of global memory; transmitting, by said first endpoint, an invalidate command to other endpoints in said data storage system to invalidate cache lines of said portion of global memory in local caches of said other endpoints, each cache-line of each endpoint's local cache is in one of an invalid state and a shared state, said shared state indicating that said cache line is currently in use and the data mapped by said cache line is consistent with global memory, and an invalid state indicates otherwise; receiving, by said first endpoint, a verification from each of said other endpoints that each of said other endpoints has received said invalidate command; and writing, by said first endpoint, to a cache line in said local cache of said first endpoint said portion of global memory. Each of the other endpoints receiving the invalidate command may invalidate cache lines of said portion of global memory in local caches by removing said cache lines of data from said local caches of said other endpoints. The endpoints may communicate using a switch fabric, and the method may further include: receiving, by a second of said other endpoints, said invalidate command on a data receive queue used in receiving messages transmitted over said switch fabric; placing, by said second endpoint, said invalidate command in an invalidate queue of said second endpoint; and performing, by said second endpoint, a data operation on said portion of cacheable global memory; and processing, by said second endpoint, all invalidate commands in said invalidate queue prior to said performing said data operation. A write through caching technique may be used in said data storage system to maintain cache coherency of said local caches of said endpoints with respect to cacheable portions of global memory stored therein. The invalidate command may be sent simultaneously to said other endpoints. The invalidate command may be sent to a portion of all endpoints in said data storage system registered as an interested recipient of messages regarding said portion of global memory. Portions of global memory may be indicated as being cacheable in accordance with a predetermined address range of global memory. The verification may be performed by each of said other endpoints by sending an acknowledgement message over a switch fabric to said first endpoint.

In accordance with another aspect of the invention is a method for maintaining cache coherency in a data storage system using a write-through caching policy between processors that communicate using a switch fabric, each processor having a local cache, the method including: determining, by a first processor, whether a portion of cacheable global memory is to be written by said first processor, each of said processors having a local cache; if said portion is to be written by said first processor, performing atomically: writing, by said first processor, said portion of global memory; transmitting, by said first processor, an invalidate command to other processors in said data storage system to invalidate cache lines of said portion of global memory at said other processors by removing said portion from local caches of said other processors, each cache line of each endpoint's local cache being in one of an invalid state and a shared state, said shared state indicating that said cache line is currently in use and the data mapped by said cache line is consistent with global memory, and an invalid state indicates otherwise; receiving, by said first processor, a verification from each of said other processors that each of said other processors has received said invalidate command; and writing, by said first processor, to a cache line in said local cache of said first processor said portion of global memory. The method may also include: receiving, by a second of said other processors, said invalidate command on a data receive queue used in receiving messages transmitted over said switch fabric; placing, by said second processor, said invalidate command in an invalidate queue of said second processor; and performing, by said second processor, a data operation on said portion of cacheable global memory; and processing, by said second processor, all invalidate commands in said invalidate queue prior to said performing said data operation.

In accordance with another aspect of the invention is a data storage system including: a switch fabric; a global memory accessed by components included in said data storage system; a plurality of processors that communicate over said switch fabric and are endpoints of said switch fabric, each of said plurality of processors including: a local cache for caching portions of said global memory; an invalidate queue that stores at least one invalidate command sent over said switch fabric between said plurality of processors, each of said invalidate commands indicating to a receiving processor to invalidate a local cache line of data corresponding to a particular global memory address; and an atomic processor that performs, for each of said plurality of processors when said each processor wants to write to a portion of cacheable global memory: writing said portion to said global memory; sending an invalidate command from said each processor to other processors in said data storage system after said writing said portion to global memory; waiting by said each processor for verification that said invalidate command has been received by said other processors; and writing said portion to said local cache of said each processor. The data storage system may also include, on each of said plurality of processors: data operation performing means that performs a data operation to said portion of global memory; a detector that determines whether an invalidate queue of said each processor is empty; and means, coupled to said detector, that performs said data operation when said invalidate queue is empty and, otherwise, processes invalidate commands in said invalidate queue. The switch fabric may include a first communication connection that transmits data used in connection with said switch fabric, said invalidate commands being sent by said each processor using said first communication connection arriving at a processor and being placed in a processor's data receive queue, and wherein each processor includes a message engine that causes transfer of said invalidate command from said data receive queue to said invalidate queue. The data storage system may also include an activator that activates said atomic processor when said each processor wants to write, to a portion of cacheable global memory.

In accordance with another aspect of the invention is a computer program product for maintaining cache coherency in a data storage system between endpoints, the computer program product including: executable code that determines, by a first endpoint, whether a portion of cacheable global memory is to be written by said first endpoint, each of said endpoints having a local cache; executable code that, if said portion is to be written by said first endpoint, performs atomically: writing, by said first endpoint, said portion of global memory; transmitting, by said first endpoint, an invalidate command to other endpoints in said data storage system to invalidate cache lines of said portion of global memory in local caches of said other endpoints, each cache-line of each endpoint's local cache is in one of an invalid state and a shared state, said shared state indicating that said cache line is currently in use and the data mapped by said cache line is consistent with global memory, and an invalid state indicates otherwise; receiving, by said first endpoint, a verification from each of said other endpoints that each of said other endpoints has received said invalidate command; and writing, by said first endpoint, to a cache line in said local cache of said first endpoint said portion of global memory. Each of said other endpoints receiving said invalidate command may invalidate cache lines of said portion of global memory in local caches by removing said cache lines of data from said local caches of said other endpoints. The endpoints may communicate using a switch fabric, and the computer program product may further include: executable code that receives, by a second of said other endpoints, said invalidate command on a data receive queue used in receiving messages transmitted over said switch fabric; executable code that places, by said second endpoint, said invalidate command in an invalidate queue of said second endpoint; and executable code that performs, by said second endpoint, a data operation on said portion of cacheable global memory; and executable code that processes, by said second endpoint, all invalidate commands in said invalidate queue prior to said performing said data operation. A write through caching technique may be used in said data storage system to maintain cache coherency of said local caches of said endpoints with respect to cacheable portions of global memory stored therein. The invalidate command may be sent simultaneously to said other endpoints. The invalidate command may be sent to a portion of all endpoints in said data storage system registered as an interested recipient of messages regarding said portion of global memory. Portions of global memory may be indicated as being cacheable in accordance with a predetermined address range of global memory. The verification may be performed by each of said other endpoints by sending an acknowledgement message over a switch fabric to said first endpoint.

In accordance with another aspect of the invention is a computer program product that maintains cache coherency in a data storage system using a write-through caching policy between processors that communicate using a switch fabric, each processor having a local cache, the computer program product including: executable code that determines, by a first processor, whether a portion of cacheable global memory is to be written by said first processor, each of said processors having a local cache; executable code that, if said portion is to be written by said first processor, performs atomically: writing, by said first processor, said portion of global memory; transmitting, by said first processor, an invalidate command to other processors in said data storage system to invalidate cache lines of said portion of global memory at said other processors by removing said portion from local caches of said other processors, each cache line of each endpoint's local cache being in one of an invalid state and a shared state, said shared state indicating that said cache line is currently in use and the data mapped by said cache line is consistent with global memory, and an invalid state indicates otherwise; receiving, by said first processor, a verification from each of said other processors that each of said other processors has received said invalidate command; and writing, by said first processor, to a cache line in said local cache of said first processor said portion of global memory. The computer program product may also include: executable code that receives, by a second of said other processors, said invalidate command on a data receive queue used in receiving messages transmitted over said switch fabric; executable code that places, by said second processor, said invalidate command in an invalidate queue of said second processor; and executable code that performs, by said second processor, a data operation on said portion of cacheable global memory; and executable code that processes, by said second processor, all invalidate commands in said invalidate queue prior to said performing said data operation.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
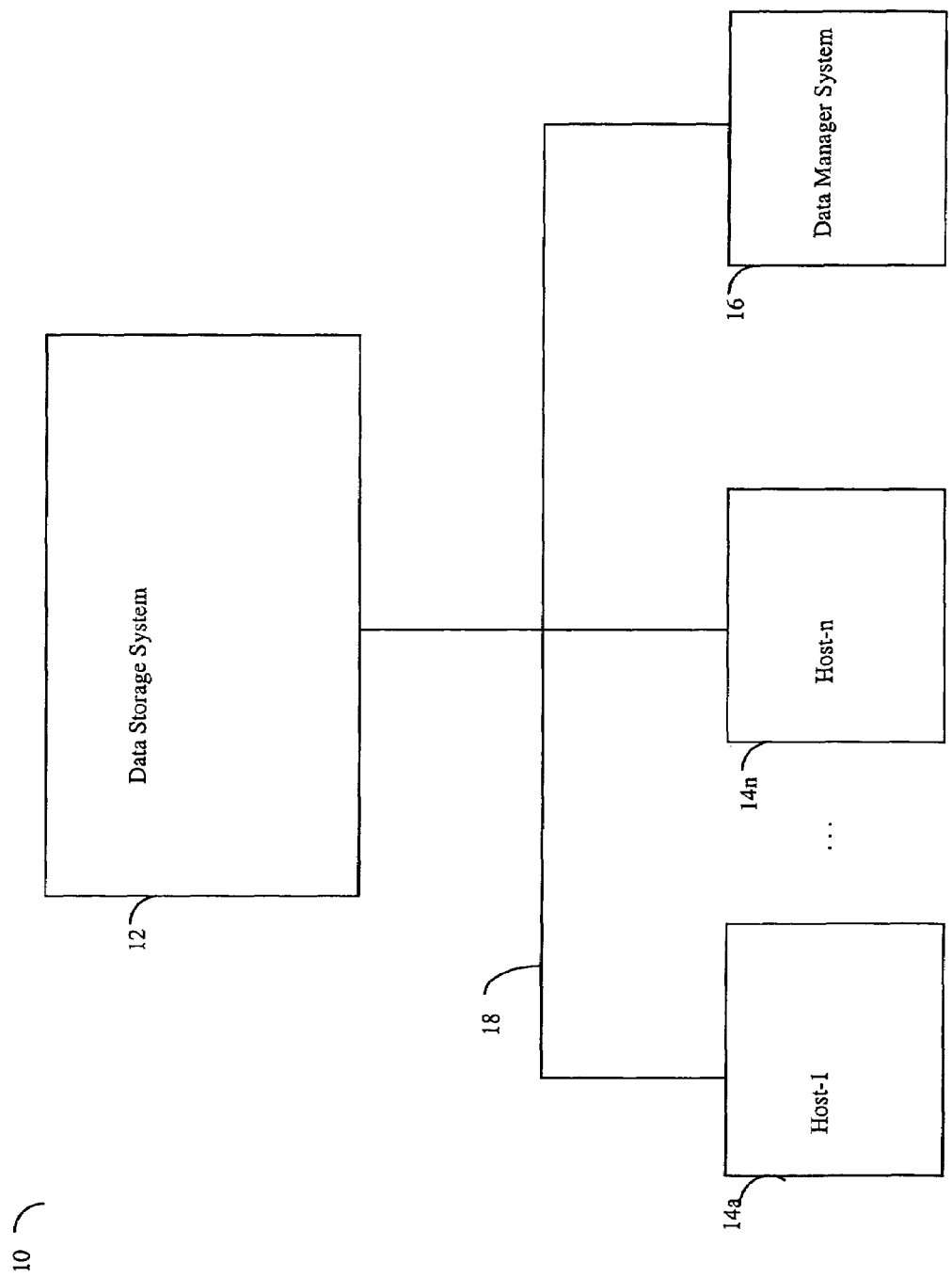
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a-14n, and a data manager system 16 through communication medium 18. In this embodiment of the computer system 10, the N hosts 14a-14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a-14n, and the data manager system may access and communicate with the data storage system 12, and may also communicate with others included in the computer system 10.

Each of the host systems 14a-14n, the data manager system 16, and the data storage system 12 included in the computer system 10 may be connected to the communication medium 18 by any one of a variety of connections as may be provided and supported in accordance with the type of communication medium 18. The processors included in the host computer systems 14a-14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a-14n and the data manager system 16, as well as those components that may be included in the data storage system 12 are described herein in more detail, and may vary with each particular embodiment. Each of the host computers 14a-14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a-14n may issue a data request to the data storage system 12 to perform a data operation.

Figure 2:
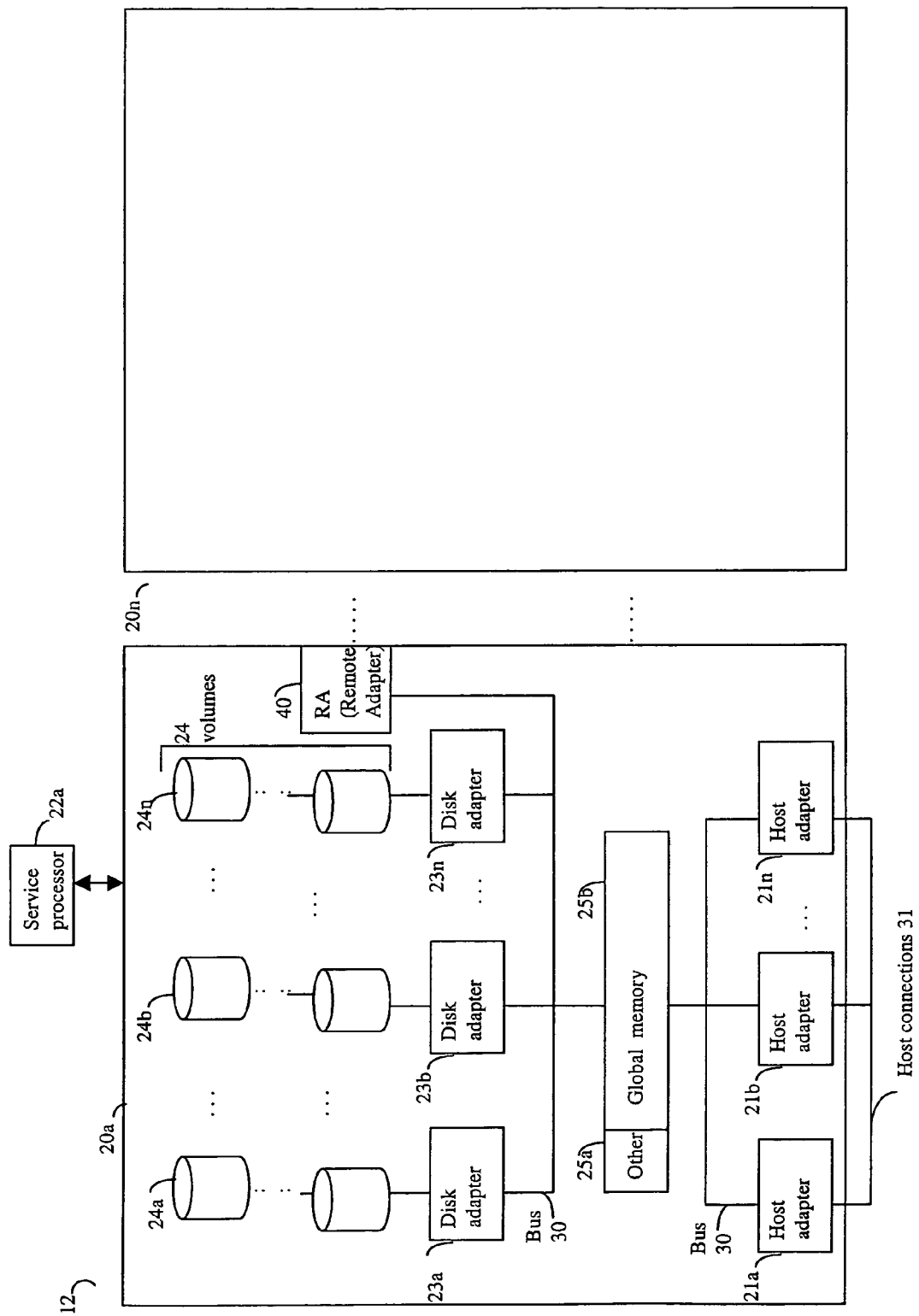
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a-20n as manufactured by EMC Corporation of Hopkinton, Mass. In this particular example, each of the Symmetrix™ storage systems 20a-20n may be inter-connected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a-20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a-23n are connected, for example, by a bus 30 to a cache that includes a particular portion designated as global memory 25b. The DAs 23a-23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment. In one embodiment, portions of configuration and device information may be stored in global memory 25b.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a-14n. This performance data may be gathered and stored, for example, in the global memory and/or other storage area.

The system 20a may also include one or more host adapters ("HAs") or directors 21a-21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations of multiple LVs that may reside on a disk. The DA may accomplish this by creating job records for the different LVs associated with the particular DA. These different job records may be associated with the different LVs in a data structure stored and managed by each DA.

Figure 3:
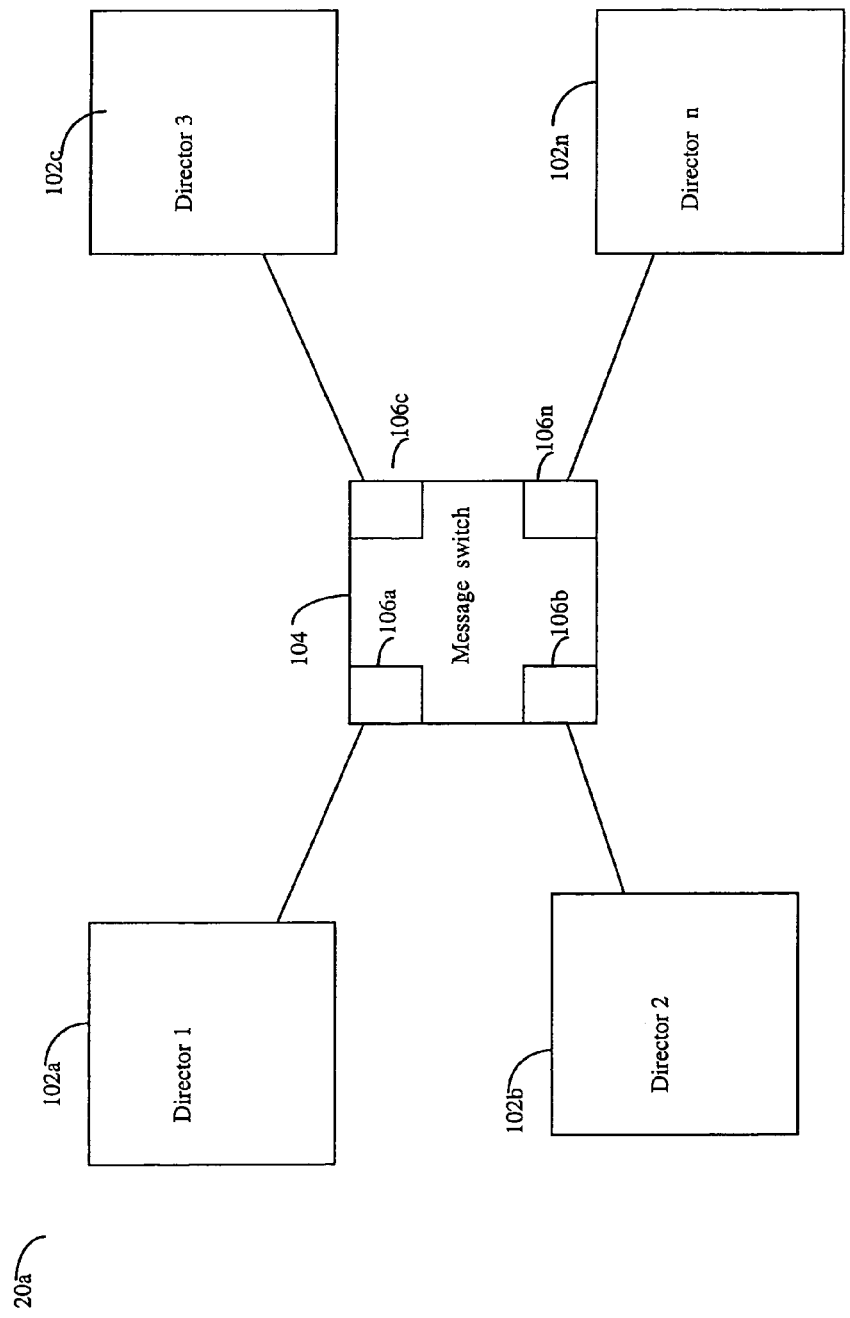
FIG. 3 is a more detailed example of one embodiment of a data storage system.

Referring now to FIG. 3, shown is a detailed example of an embodiment of components that may be included in the data storage system 20a. It should be noted that an embodiment may include other components than as shown in FIG. 3. The data storage system 20a of FIG. 3 presents a simplistic view including only particular components described previously in connection with FIG. 2 for purposes of illustration and example in connection with techniques that are described in the following paragraphs. It should also be noted that the components of FIG. 3 as described in connection with system 20a may also be included in each of systems 20b-20n.

This embodiment of the system 20a includes directors 102a through 102n and a message switch 104. The message switch 104 may be included within the switch fabric. The message switch may be used in routing messages between different directors or processors 102a through 102n. Included in the message switch 104 of this embodiment are a plurality of hardware message buffers 106a-106n. The message switch 104 controls the flow of incoming messages that may be stored in each of the buffers 106a through 106n from a respective director 102a through 102n connected to the message switch. Each of the directors 102a through 102n may be a processor or a printed circuit board that includes a processor and other hardware components. Each of the directors 102a through 102n may be referred to as nodes or endpoints within the system 20a. The message switch provides link-level flow control information by providing for flow of control of messages being transmitted, for example, between the message switch and a single director.

Figure 4:
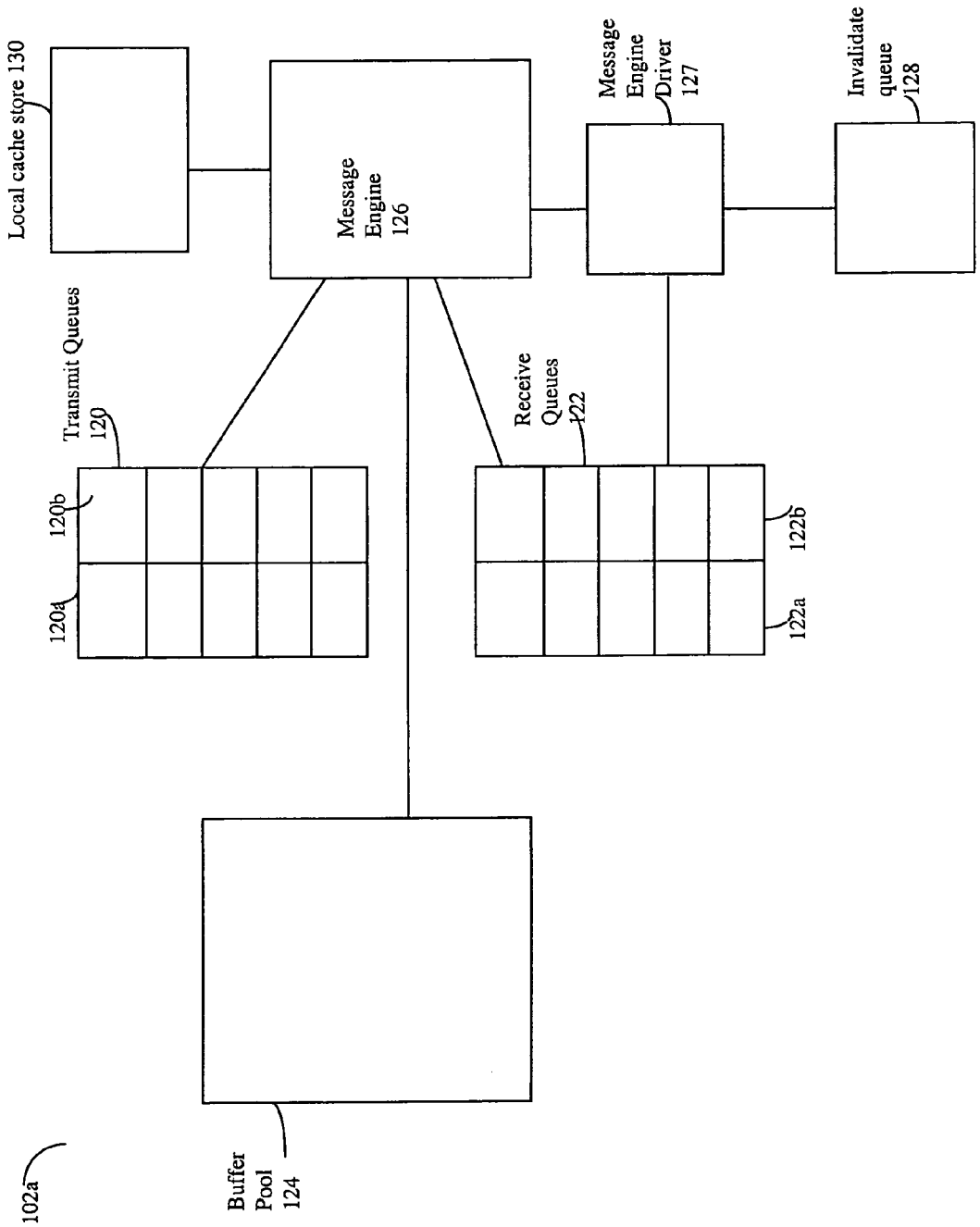
FIG. 4 is an example of an embodiment of components that may be included in a director.

Referring now to FIG. 4, shown is an example of an embodiment of hardware and/or software components that may be included within a director, such as director 102a. It should be noted that although details are shown for a single director 102a, each of the other directors 102b through 102n may similarly include components as described in connection with FIG. 4. An embodiment of a director may also include other components than as shown in FIG. 4. Included in FIG. 4 is a buffer pool 124, transmit queues 120, receive queues 122, a message engine 126, an invalidate queue 128, a local cache store (LCS) 130, and a Message Engine Driver 127.

In this embodiment, there are two types of receive queues 122—a data receive queue 122a and a control receive queue 122b—used for buffering received transmissions. Additionally, in this embodiment are two types of transmit queues 120—a data transmit queue 120a and a control transmit queue 120b—used for buffering outgoing transmissions. A transmission or message may be a control transmission or a data transmission. Control transmissions or messages may be characterized as commands used in connection with controlling the flow of data messages between nodes. An embodiment may alternatively have a single transmit and/or receive queue that collectively holds both control and data messages rather than a separate queue for control messages and data messages.

An incoming transmission of the director or node 102a is placed in the appropriate one of the receive queues 122. The incoming transmission may then be retrieved from the receive queue 122 by the message engine which extracts appropriate data portions for processing and places the data within a buffer obtained from the buffer pool 124. An outgoing message is placed in the appropriate one of the transmit queues 120. The message engine 126 extracts the data portion from the transmit queues 120 and forwards it to the message switch. It should be noted that the transmit queues 120 and the receive queues 122 may be used as temporary holding areas for transmissions respectively sent from, and to, a node or director 102a.

The local cache store (LCS) 130 may be implemented in hardware, such as a portion of SDRAM allocated for use by a single director or processor 102a. The LCS may include a locally cached copy of data. In one embodiment, the director 102a may use its LCS 130 to cache a local copy of a portion of data from global memory, such as global memory 25b. Described in detail elsewhere herein are techniques used in maintaining local cache coherency between the cacheable data as may be stored in global memory and each of the LCS's as may be maintained and used by each director. In the embodiment described herein, a write-through caching technique, as opposed to a write-back caching technique, is used.

Cacheable global memory data included in an LCS may be "invalidated" when the corresponding copy of the data in global memory is updated. In the embodiment described herein, a director 102a receives an incoming invalidate command for a data portion at a specified global memory address when the global memory copy of the data portion is written, such as with a data update. The invalidate command received by the director 102a is placed in the invalidate queue 128.

In one embodiment, the invalidate queue 128 may be implemented and managed in software in contrast to the hardware queues, such as the transmit and receive queues. The invalidate queue may be implemented and managed by a processor executing instructions, such as may be produced using software. An incoming invalidate command may be sent using the switch fabric data line or communication connection so that the invalidate command sent to director 102a is placed into the data receive queue 122a. In this embodiment, the invalidate command is then retrieved by the message engine from the data receive queue 122a, and forwarded to software for placement and processing in the invalidate queue. In this embodiment, the Message Engine 126 retrieves the invalidate message from the hardware queue, the data receive queue 122a, and then forwards it to the Message Engine Driver 127 for placement into the invalidate queue 128. In one embodiment, the Message Engine Driver 127 is a device driver.

It should be noted that in this embodiment, the transmit queues 120 and the receive queues 122 are implemented in hardware, such as a portion of SDRAM (synchronous dynamic random access memory), and the buffer pool 124 is a portion of memory from which the data is allocated and used in connection with extracting the appropriate data portions of an incoming transmission for use within a particular node. Message engine 126 is implemented in hardware and manages the message queues. The invalidate queue 128 may be implemented using a portion of memory, such as a RAM (random access memory). Other embodiments may implement these and other components in varying combination of hardware and/or software.

What will now be described are techniques that may be utilized in connection with maintaining the local cache coherency between two directors or nodes. The techniques described herein may be used in other embodiments, for example, in which the nodes are other endpoints besides the directors as described herein.

Figure 5:
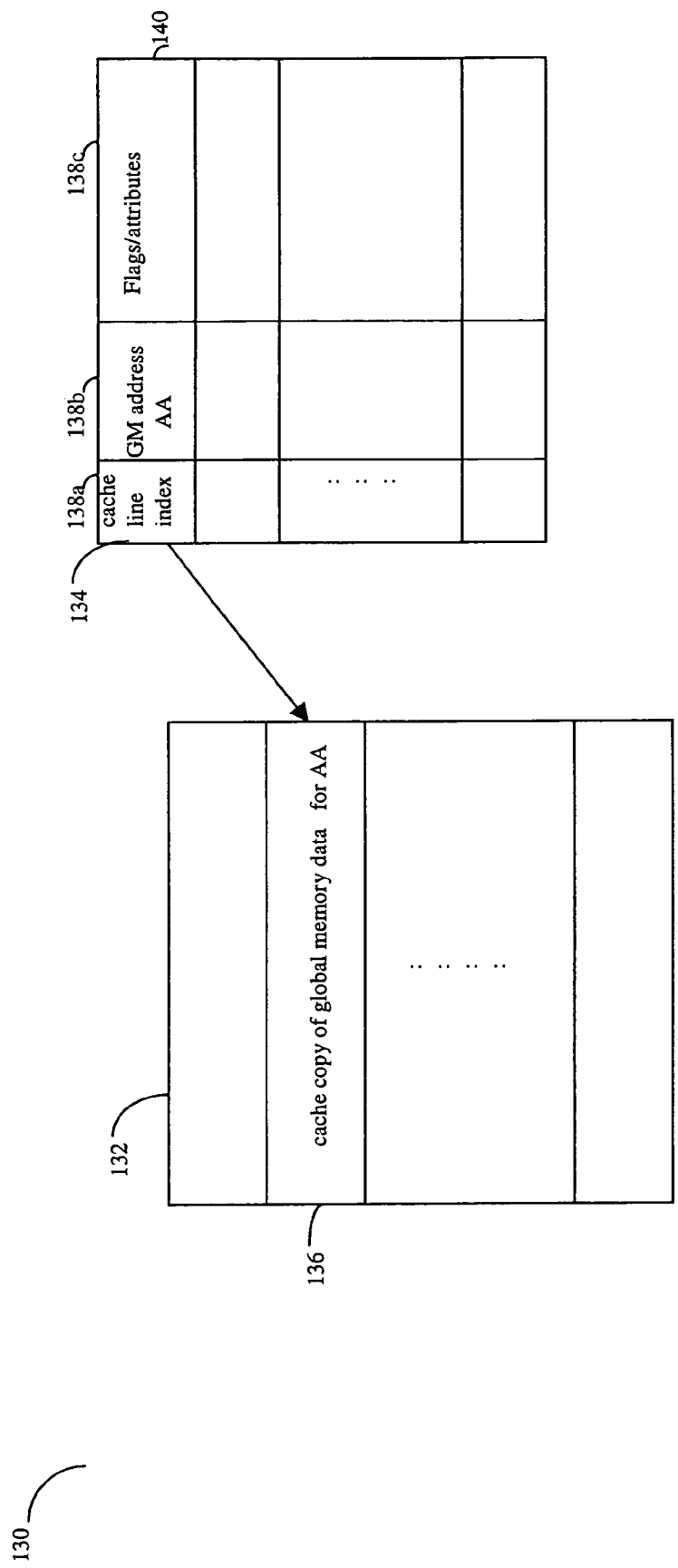
FIG. 5 is an example of components that may be included in the local cache store (LCS) of FIG. 4.

Referring now to FIG. 5, shown is an example of an embodiment of the local cache store or LCS 130 as included in each director of FIG. 4. Within the LCS 130, each director may dedicate a portion of LCS to act as a cache for a cacheable global memory data. The arrangement and representation shown in connection with FIG. 5 is one particular representation that may be used in an embodiment. Other embodiments may use other structures and techniques than as described herein in implementing and managing the cache included in an embodiment.

Included in LCS 30 is the cache line data portion 132 including the cache lines of data, and a structure of cache tags or indices 134. Cache line data portion 132 includes a plurality of cache lines of the global memory data being cached. The data stored in the cache lines of 132 may be accessed using a unique one of the cache tags or indices 134. Shown in FIG. 5 is a single cache line of data 136 which includes a cached copy of the data corresponding to global memory Address AA. The data stored in cache line 136 corresponds to data stored at global memory address AA. The data in cache line 136 may be accessed using a cache tag or index included in the cache tag 140. Shown in FIG. 5 is a single cache tag or index 140 that includes the following 3 fields: the cache line index 138a, the global memory address 138b, and the flags or attributes field 138c. It should be noted that other tags within the structure 134 contain the same fields as just described in connection with cache tag 140. In this example, cache tag 140 may be used to access the data stored in cache line 136 corresponding to global memory address AA. When an operation, such as a read or a write to a cacheable portion of global memory data, is made, the corresponding memory address may be accessed or looked up using the contents of field 138b. Once a global memory address has been located within a particular tag of structure 134, the corresponding cache line index stored in the cache line index field 138a may be used to access the particular cached data at location 136. Additionally, field 138c may include flags and attributes describing the state of the data stored within the cache line 136.

It should be noted that the sizes of each of the entries included in the structure 134 as well as the size of each cache line of data included in the cache line data portion 132 may vary in accordance with each embodiment. Similarly, the size of each individual field included within a single entry of structure 140 may also vary in accordance with each embodiment. In one embodiment, both the cache line portion 132 and the cache tags of 134 may be stored within the LCS 130. The caching model as used and described herein is known in the art as a write though caching technique with respect to the cacheable data of global memory. The use of a write through caching model and the relevant states used with respect to a particular cache line of data is described in more detail elsewhere herein.

It should be noted that in connection with performing a cache look up within the LCS, for example, to determine whether or not a particular address of global memory data has been cached by a director, any one of a variety of different techniques may be used in connection with making this determination. One embodiment may use a modified binary search algorithm using a table of indices 134 sorted by global memory addresses as indicated in field 138b. Additionally, the index structure 134 includes only those indices for valid cache lines that are not in the invalid state, as described elsewhere herein.

What will now be described are the different steps that may be performed by each director or processor in connection with the cache coherency protocol of one embodiment described herein. What will be described are four different operations including a read miss operation, a read hit operation, a write miss operation, and a write invalidate operation.

When a read operation or request is performed with respect to a particular global memory address for the first time, processing steps of a read miss operation are performed. With a read miss, a read request is made for particular portion of global memory after it is determined that particular portion of global memory desired is currently not in the cache of a requesting director. Accordingly, the data is read from global memory, and subsequently the requesting director's cache is updated to cache that portion of global memory just read.

A read hit operation occurs when a read request is made to read data from global memory, and that data is already in the requesting director's cache. At this point, the processor or director simply accesses the contents of the corresponding global memory address from its cache. It should be noted that as described herein, prior to processing or performing a read or write request for a portion of global memory, all outstanding invalidate operations included in the invalidate queue described elsewhere herein are processed.

A write miss operation occurs when a write request is made to a global memory address and the data at that address is currently not in the cache of the requesting director. A write invalidate operation occurs when a write request is made to a global memory address and the data at that address is currently in the cache of the requesting director. In this embodiment, similar processing steps are performed for the write miss and the write invalidate operation. The processing steps of the write invalidate operation and the write miss operation are performed atomically to avoid race conditions with the read miss operation and its associated processing steps described elsewhere herein. As part of write invalidate and write miss processing, the global memory is updated. An invalidate command is issued simultaneously to all end points, which in this embodiment are directors or processors. The director or processor which just updated global memory waits for verification that the invalidate command has been received by all other end points. Subsequently, when verification has been received from all other processors or directors, the director or processor that has just updated global memory now updates its cache line.

It should be noted that with the foregoing processing steps for the write invalidate and write miss operation as described herein, the data is written first to global memory before the invalidate command is performed by any of the end points. This ordering and the atomic processing of operations associated with the write invalidate and write miss processing ensures that when a reader performs read-miss processing for a portion of global memory, the current version of that portion of global memory data has already been stored in and updated in global memory.

Rather than transmitting the invalidate command simultaneously to all end points, an embodiment may also choose to transmit the invalidate command simultaneously to those end points which have previously been registered as a participant in a group to receive messages and commands associated with a predetermined portion of cacheable global memory. In other words, an embodiment may selectively choose to have each director or processor register as a participant indicating whether or not each director wishes to receive messages concerning updates to particular cacheable address ranges of global memory. The foregoing registry of directors or end points that should receive the invalidate command may be stored, for example, in global memory or another location. At the time an invalidate message is to be sent out, the director or processor sending out the message may use the participants included in this registry as a list of message recipients. An embodiment may also choose to broadcast the invalidate command to all end points rather than using a list of participants as included in the registry.

Receiving an invalidate command or message on the invalidate queue 128 causes its recipient to invalidate any cached data corresponding to the global memory address of the invalidate command. In this embodiment, invalidation of the data cache line includes removing the particular cache line from the index which includes only valid cache lines.

Figure 6:
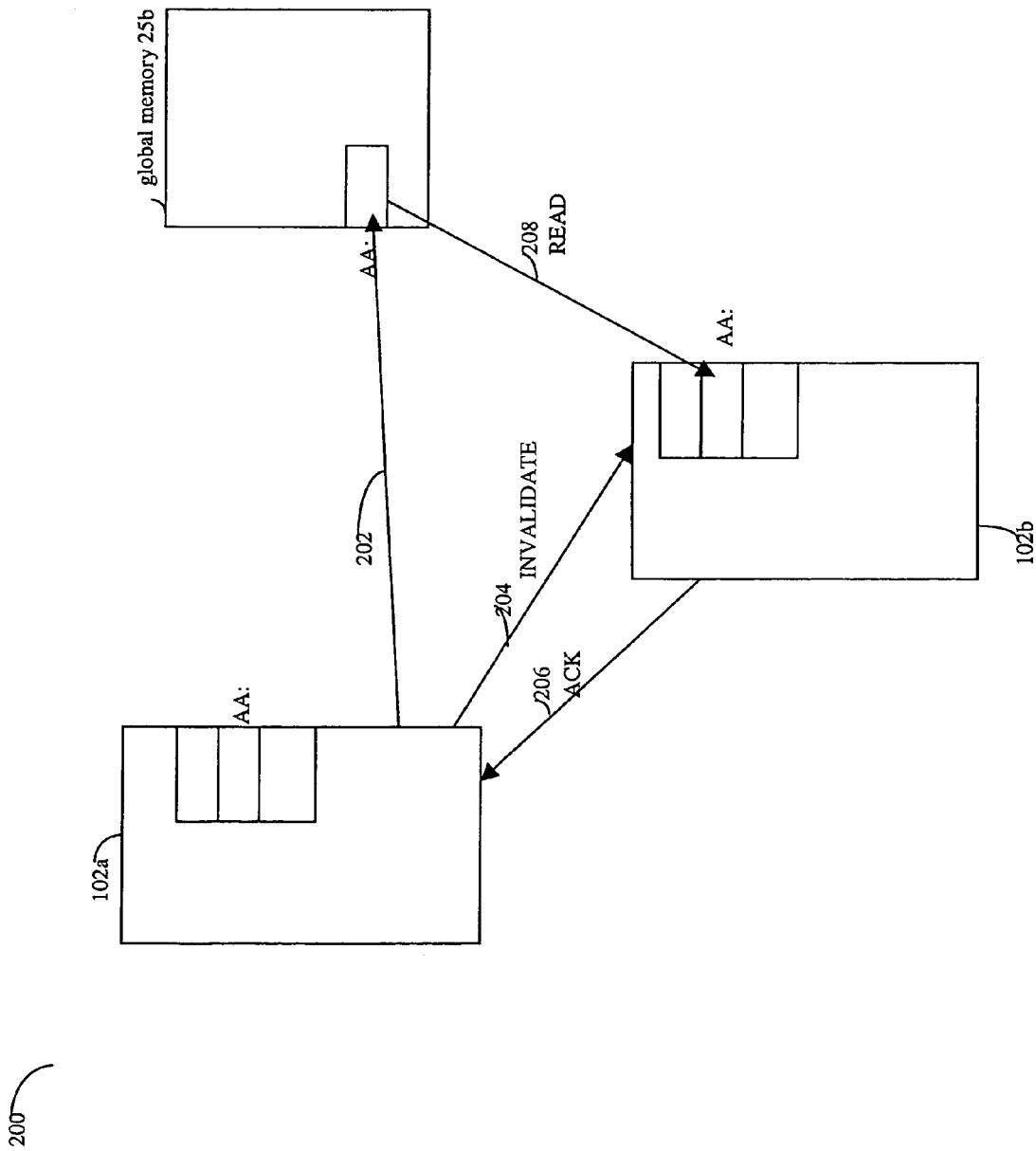
FIG. 6 is an example illustrating the data flow between components included in an embodiment of the data storage system of FIGS. 1 and 2.

Referring now to FIG. 6, shown is an example illustration 200 of components of the data storage system and data flow therebetween. It should be noted that the components included in the illustration 200 present a simplified view including only those components, and the portions thereof, used for the purposes of illustration in connection with performing a write invalidate or a write miss operation subsequently followed by a read miss operation.

In one example, processor 102*a* performs a write or an update to global memory address AA. With respect to director 102*a*, either a write miss or a write invalidate operation associated processing steps as described herein are performed. As part of this processing, director 102*a* performs a write to global memory address AA with the updated data as indicated by arrow 202. Director 102*a* then sends an invalidate command simultaneously to all other processors or directors as indicated arrow 204. The invalidate command is placed in each directors invalidate queue. Each of the other processors, such as processor 102*b*, sends an acknowledgement message to the sending director 102*a* upon receiving the invalidate command. This is indicated by arrow 206 in the illustration 200 of FIG. 6. When director 102*a* has received the acknowledgement from all of the other directors or endpoints, the director 102*a* updates its local cache line. In connection with write invalidate and write-miss processing, the director 102*a* performs the foregoing steps atomically.

Prior to performing the next read or write request regarding a portion of cacheable global memory, the director 102*b* first processes all of its invalidate commands included in the invalidate queue. In this embodiment, part of the process of invalidating a particular cache line of data includes removing it from the list of indices included in the previously described structure 134 in connection with FIG. 5. It should be noted that an embodiment may indicate a particular entry in the table 134 as being invalid or not corresponding to a particular cache line of data in a variety of different ways that may vary with the data structure used in implementation of the structure 134. For example, one embodiment may implement the structure 134, without limitation, as an array, linked list, or other type of data structure as known to those of ordinary skill in the art. Accordingly, the particular techniques used in connection with removing an element from the index table 134 may also vary in accordance with the particular data structure selected for implementation.

After director 102*b* has processed all of the entries included in its invalidate queue, the director 102*b* may perform the read or write request of the cacheable global memory data. In this example, a read request is made for a portion of global memory data that may also be cached locally within each of the directors. This read request is a read request for data at global memory address AA. A read miss operation and associated processing steps are performed. As a result of the processing of the invalidate command (arrow 204), the local cache line of director 102*b* corresponding to global address AA has been invalidated. The read miss detected by processor 102b results in data being read from global memory 25b as indicated by arrow 208. Director 102b then stores this updated global memory portion of data into its LCS with a cache line index for global memory address AA.

It should be noted that as described herein, any one of a variety of different techniques may be used in connection with indicating which portion(s) of global memory are cacheable by each of the endpoints. An embodiment may designate whether a portion of global memory is cacheable based on a predetermined global memory address range or location. It should also be noted that specifying a particular address range may affect whether the registry of endpoints used in connection with sending the invalidate command is cacheable. Whether or not a particular portion of global memory is cacheable by each of the endpoints is a policy decision and may vary in accordance with each embodiment.

It should be noted that in one embodiment, a first communication connection may be used by each of the directors to perform updates to global memory. This first communication connection is separate and distinct from any communication connection(s) of the switch fabric.

The foregoing description maintains local cache coherency in an efficient manner by taking into account the number of write operations or updates to a cacheable portion of global memory. Use of the techniques described herein may provide for increased performance in embodiments in which there are relatively a small number of writes to cacheable global memory in comparison to the number of read operations performed for cacheable global memory.

Figure 7:
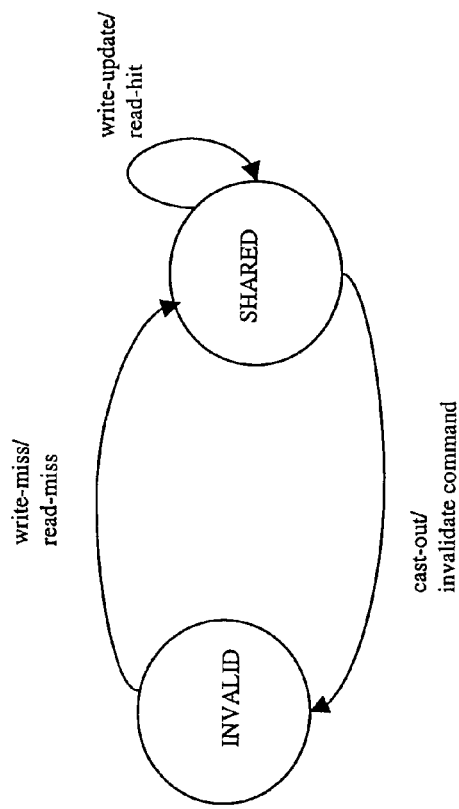
FIG. 7 is an example of a state transition diagram indicating the states associated with a cache-line included in the LCS of FIG. 5.

Referring now to FIG. 7, shown is a state diagram 250 showing the states and transitions between them associated with each of the cache lines previously described in connection with the LCS 130. As described elsewhere herein, each cache line may be in one of two states: invalid or shared. The invalid state is the start state and is associated with any unused cache line. Initially, all cache lines are in the invalid state. A cache line transitions from the invalid state to the shared state as data is loaded into the cache line of data, such as in connection with a write miss or a read miss operation. Once in the shared state, a cache line may remain in the shared state if a read operation is performed and the data is located in the local cache. This is denoted as the read hit operation. Additionally, a write update operation also causes a cache line to remain into the shared state. A cache line transitions from the shared to the invalid state in connection with processing an invalidate command when that particular cache line of data is removed from the cache and the index or tag structure 134. Additionally, an embodiment may invalidate a cache line by performing a cast out operation, for example, when there are no more cache lines in the invalid state and an additional cache line is needed. At this point, a cache line of data that is in use is selected and displaced transitioning the cache line into the invalid state. The cast out operation may be performed, for example, when there is a cache miss operation and there are no available cache lines in the invalid state. It should be noted that whether and how frequently this type of operation or displacement occurs in connection with the cast out is tunable in accordance with the size of the cache allocated, frequency of use and other operating parameters that may vary in accordance with each embodiment.

Figure 8:
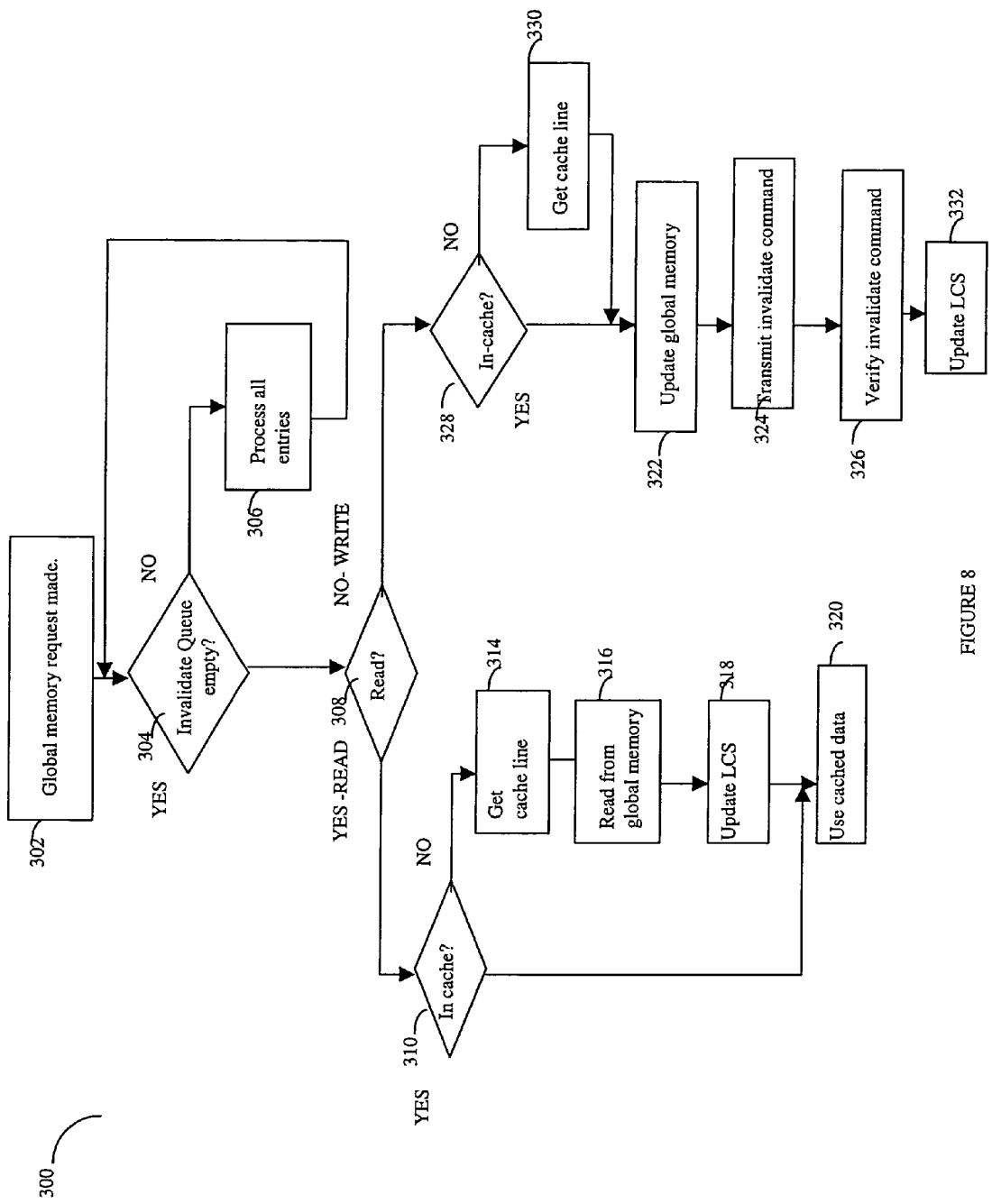
FIG. 8 is a flowchart of steps of one embodiment of the cache coherency protocol for a write-through caching technique.

Referring now to FIG. 8, shown is a flowchart 300 summarizing processing that may be performed by a director in connection with a global memory request. The flowchart 300 summarizes the processing steps described elsewhere herein. At step 302, a global memory request is made. As part of processing at step 302, it is determined that the portion of global memory being accessed may be cached by each director. At step 304 a determination is made as to whether the invalidate queue on the director initiating the global memory request is empty. If the invalidate queue is not empty, control proceeds to step 306 where all of the entries within the invalidate queue are processed until it is determined that the director's invalidate queue is empty. Control then proceeds to step 308 where a determination is made as to whether the global memory request is for a read operation. If so, control proceeds to step 310 where a determination is made as to whether the requested portion of data is in the requesting director's cache. At step 310, if it is determined that the data is not within the requesting director's cache, a cache miss results. Control proceeds to step 314 where a cache line of the requesting processor is obtained. Data is read from global memory at step 316, and the cache line in the requesting director's LCS is updated at step 318. Control then proceeds to step 320 where the cached copy of the data is then used by the director. If, at step 310, it is determined that the data requested for the read is in the requesting director's LCS, control proceeds directly to step 320.

At step 308, if it is determined that the global memory request is not a read operation but is rather a write operation, control proceeds to step 328 where a determination is made as to whether the requested portion of global memory is currently in the requesting director's cache. If, at step 328, it is determined that the data is not in the requesting director's cache, control proceeds to step 330 where a cache line is obtained. Control proceeds to step 322 where global memory is updated. Subsequently at step 324, an invalidate command is transmitted to all other endpoints in the system. At step 326, the director that sent the invalidate command transmission to all other endpoints verifies that the invalidate command has been received by each of the other endpoints. In one embodiment, this may be performed by having each of the other endpoints send an acknowledgement to the sender of the invalidate command. Once the verification of the invalidate command has been performed, control proceeds to step 332 where the LCS of the director that transmitted the invalidate command is updated. As described elsewhere herein, the processing of steps 322, 324, 326 and 332 are performed as an atomic operation in order to avoid any race conditions, for example, in connection with read miss operation processing steps.

It should be noted that the particular technique in deciding which cache lines of data are displaced in the event that a new cache line is needed, for example, in connection with a cache miss operation when there are currently no available cache lines, may vary in accordance with each embodiment. Any one of a variety of different techniques may be used in connection with cache management and policies implemented in an embodiment.

In the embodiment described herein, each of the directors reads and writes directly to global memory. Acknowledgement messages, invalidate messages, and the like are all sent and generated by the hardware. In one embodiment, the sending director of the invalidate message waits by executing machine executable instructions, such as may be generated using software. The sender waits to receive the acknowledgement message from each of the recipients of the invalidate message.

As described herein, the buffer pool may be used as a pool of free buffer space for the transmit queue and/or the receive queue. The extent to which this space is used may affect the selection and tuning of system parameters that may vary in accordance with each embodiment.

In connection with messages transmitted in the foregoing, it should be noted that other messages may be sent in response to receiving a message, such as an acknowledgement message, in accordance with the messaging protocol utilized. An acknowledgement message may be sent, for example, in response to a node or endpoint receiving a broadcast message.

The foregoing embodiment described herein, such as in connection with FIG. 3, uses the same communication connection to transmit control messages and data messages. An embodiment may also use separate connections for transmitting each of control messages and data messages. Accordingly, this factor may be taken into account when determining bandwidth for processing messages in each particular embodiment.

It should be noted that the foregoing components described herein and the associated functionality may be performed in hardware and/or software. The hardware queues may be implemented, for example, using a portion and type of RAM. Software may be used to manage the invalidate queue. Hardware may be used to generate and send all flow control frames or messages. At a receiving node, hardware may receive the incoming data and control messages and then forward the incoming messages to software, for example, to place invalidate commands in the invalidate queue and further process them.

In connection with the foregoing description, an embodiment may implement any one or more of a variety of different policies in connection with processing messages from the data and control queues. In one embodiment, a round-robin type of policy may be implemented such that, over time, the processing of messages from both queues approximates a Gaussian distribution.

The foregoing techniques described herein may be implemented in an embodiment supporting the broadcast-based messaging protocol, or an equivalent.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed by a first processor for maintaining cache coherency between a first local cache of the first processor and one or more other local caches, the method comprising:
   issuing, by said first processor, a global memory request to perform an operation in connection with a portion of global memory;
   processing, by said first processor, any invalidate commands to invalidate cache lines of global memory included in said first local cache;
   determining whether the global memory request is a request to write to said portion of global memory;
   processing the global memory request by the first processor, wherein if said global memory request is a request to write to said portion of global memory, the first processor performing processing as an atomic operation, said processing performed as an atomic operation including:
      updating the portion of global memory in accordance with the request, said updating of global memory being performed prior to invalidating any copy of said portion of global memory in said one or more other local caches by one or more other processors;
      receiving one or more acknowledgements from said one or more other processors that said one or more other processors will invalidate local copies of said portion of global memory; and
      updating the first cache to include a copy of said portion of said global memory in accordance with the request to write to said portion.

2. The method of claim 1, wherein processing of any invalidate commands is performed prior to processing the global memory request.

3. The method of claim 1, wherein said processing performed as said atomic operation further includes:
   sending, in response to said updating the portion of global memory, an invalidate command to at least one other processor having another of said other local caches to invalidate any copy of said portion of global memory included in said another local cache;
   receiving verification from said at least one other processor confirming receipt of the invalidate command; and
   wherein said updating the first local cache is performed in response to said receiving verification, and said verification is one of said acknowledgements.

4. The method of claim 3, further comprising:
   receiving, by a second processor having a second of the other local caches, an invalidate command from the first processor;
   processing, by the second processor, the invalidate command causing the second processor to remove a copy of the second portion from the second of the other local caches;
   processing, after processing the invalidate command, a read request to read said portion from said global memory.

5. The method of claim 3, wherein said first processor sends an invalidate command to a portion of all local processors in a data storage system registered as an interested recipient of messages regarding said portion of global memory.

6. The method of claim 1, further comprising, performing processing by the first processor when the global memory request is a request to write to said portion of global memory, said processing including:
   determining whether a copy of said portion of the global memory is in said first local cache; and
   obtaining a cache line in said first local cache if there is no copy of said portion in said first local cache.

7. The method of claim 1, wherein said first processor, said other processors, and said global memory are included in a data storage system.

8. The method of claim 1, wherein said processing of an invalidate command by said first processor to invalidate a cache line containing a copy of a section of global memory included in said first local cache includes removing, by said first processor, said copy from the first local cache.

9. The method of claim 1, wherein if the global memory request is a request to write to said portion of global memory, the global memory request is one of a write miss operation and a write invalidate operation, the write miss operation being when a write request is made to a global memory address and data from the global memory at the global memory address is not in the first local cache, the write invalidate operation being when a write request is made to a global memory address and data from the global memory at the global memory address in the first local cache.

10. The method of claim 1, wherein each cache-line of each local cache is in one of an invalid state and a shared state, said shared state indicating that said cache line is currently in use and the data mapped by said cache line is consistent with global memory, and an invalid state indicates otherwise.

11. The method of claim 10, wherein each of the local caches include only data that is in a valid state, the first processor determines whether a portion of global memory is included in the first local cache using a binary searching technique with a list of sorted global memory addresses associated with cache lines of the first local cache.

12. The method of claim 1, wherein said processors communicate using a switch fabric and the method further comprising:
  retrieving, by a message engine, one or more invalidate commands from a data receive queue of the first processor used in receiving messages transmitted over said switch fabric; and
  forwarding, by the message engine to another component, the one or more invalidate commands for placement in an invalidate queue.

13. The method of claim 1, wherein said global memory and each of said first local cache and said one or more other local caches are different, said global memory being globally accessible by each of said first processor and said other processors wherein no portion of said global memory is local with respect to any of said first processor and said other processors.

14. A computer readable storage medium including code stored thereon for maintaining cache coherency between a first local cache of a first processor and one or more other local caches, the computer readable medium comprising code stored thereon for:
  issuing, by said first processor, a global memory request to perform an operation in connection with a portion of global memory;
  processing, by said first processor, any invalidate commands to invalidate cache lines of global memory included in said first local cache;
  determining whether the global memory request is a request to write to said portion of global memory;
  processing the global memory request by the first processor, wherein if said global memory request is a request to write to said portion of global memory, the first processor performing processing as an atomic operation, said processing performed as an atomic operation including:
    updating the portion of global memory in accordance with the request, said updating of global memory being performed prior to invalidating any copy of said portion of global memory in said one or more other local caches by one or more other processors;
    receiving one or more acknowledgements from said one or more other processors that said one or more other processors will invalidate local copies of said portion of global memory; and
    updating the first local cache to include a copy of said portion of said global memory in accordance with the request to write to said portion.

15. The computer readable storage medium of claim 14, wherein processing of any invalidate commands is performed prior to processing the global memory request by the first processor, and said processing performed as said atomic operation further includes:
  sending, in response to said updating the portion of global memory, an invalidate command to at least one other processor having another of said other local caches to invalidate any copy of said portion of global memory included in said another local cache;
  receiving verification from said at least one other processor confirming receipt of the invalidate command; and
  wherein said updating the first local cache is performed in response to said receiving verification, and said verification is one of said acknowledgements.

16. The computer readable storage medium of claim 14, further comprising code for performing processing by the first processor when the global memory request is a request to write to said portion of global memory, said code for performing processing including code for:
  determining whether a copy of said portion of the global memory is in said first local cache; and
  obtaining a cache line in said first local cache if there is no copy of said portion in said first local cache.

17. The computer readable storage medium of claim 14, wherein said first processor, said other processors, and said global memory are included in a data storage system.

18. The computer readable storage medium of claim 14, wherein said processing of an invalidate command by said first processor to invalidate a cache line containing a copy of a section of global memory included in said first local cache includes removing, by said first processor, said copy from the first local cache.

19. The computer readable storage medium of claim 14, wherein if the global memory request is a request to write to said portion of global memory, the global memory request is one of a write miss operation and a write invalidate operation, the write miss operation being when a write request is made to a global memory address and data from the global memory at the global memory address is not in the first local cache, the write invalidate operation being when a write request is made to a global memory address and data from the global memory at the global memory address in the first local cache.

20. The computer readable storage medium of claim 14, wherein each cache-line of each local cache is in one of an invalid state and a shared state, said shared state indicating that said cache line is currently in use and the data mapped by said cache line is consistent with global memory, and an invalid state indicates otherwise, each of the local caches including only data that is in a valid state, the first processor determining whether a portion of global memory is included in the first local cache using a binary searching technique with a list of sorted global memory addresses associated with cache lines of the first local cache.

* * * * *